United States Patent
Reilly et al.

(10) Patent No.: US 10,075,510 B2
(45) Date of Patent: Sep. 11, 2018

(54) ANALYTICS-BASED UPDATE OF DIGITAL CONTENT

(71) Applicant: Google Inc., Mountain View, CA (US)

(72) Inventors: James Reilly, Boston, MA (US); Sami Mohammed Shalabi, Lexington, MA (US); Mehul Agarwal, Boston, MA (US); Michael Scott Depinet, Austin, TX (US)

(73) Assignee: Google LLC, Mountain View, CA (US)

( * ) Notice: Subject to any disclaimer, the term of this patent is extended or adjusted under 35 U.S.C. 154(b) by 580 days.

(21) Appl. No.: 14/210,050

(22) Filed: Mar. 13, 2014

(65) Prior Publication Data

US 2015/0264115 A1 Sep. 17, 2015

(51) Int. Cl.
| | |
|---|---|
| G06F 15/18 | (2006.01) |
| H04L 29/08 | (2006.01) |
| G06N 99/00 | (2010.01) |
| H04L 29/06 | (2006.01) |

(52) U.S. Cl.
CPC ........... H04L 67/10 (2013.01); G06N 99/005 (2013.01); H04L 67/04 (2013.01); H04L 67/32 (2013.01); H04L 67/42 (2013.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| | | |
|---|---|---|
| 8,547,383 B2 | 10/2013 | Subramaniam et al. |
| 2006/0277271 A1 | 12/2006 | Morse et al. |
| 2011/0029670 A1 | 2/2011 | Klein et al. |
| 2011/0040636 A1* | 2/2011 | Simmons ............... G06Q 30/02 705/14.71 |
| 2013/0091087 A1 | 4/2013 | Prakash et al. |
| 2013/0159274 A1 | 6/2013 | Silberstein et al. |
| 2013/0226837 A1 | 8/2013 | Lymberopoulos et al. |

(Continued)

FOREIGN PATENT DOCUMENTS

| | | |
|---|---|---|
| KR | 10-1180535 B1 | 9/2012 |
| WO | WO 2001/033435 A1 | 5/2001 |

(Continued)

OTHER PUBLICATIONS

PCT International Search Report and Written Opinion for PCT/US2015/019706, dated May 29, 2015, 11 Pages.

(Continued)

*Primary Examiner* — Christyann R Pulliam
*Assistant Examiner* — Viker A Lamardo
(74) *Attorney, Agent, or Firm* — Shumaker & Sieffert, P.A.

(57) ABSTRACT

Content on a client device is updated. Analytics data describing how a user uses the client device to consume digital content are received. The analytics data are generated by the client device responsive to observations of how the user uses the client device to consume digital content. A prediction model is generated based on the analytics data and used to predict when the user will consume digital content on the client device. Prediction data describing the prediction are provided to the client device. The client device uses the prediction data to request updated digital content prior to when the user is predicted to consume digital content on the client device.

12 Claims, 6 Drawing Sheets

(56) References Cited

U.S. PATENT DOCUMENTS

| | | | | |
|---|---|---|---|---|
| 2013/0311408 | A1* | 11/2013 | Bagga | G06N 99/005 706/12 |
| 2014/0317031 | A1* | 10/2014 | Babenko | G06F 17/30017 706/12 |
| 2015/0154506 | A1* | 6/2015 | Jain | G06N 99/005 706/12 |
| 2015/0178281 | A1* | 6/2015 | Steiner | G06F 17/30905 707/748 |
| 2015/0178370 | A1* | 6/2015 | Shabtai | H04L 67/06 707/748 |
| 2016/0191650 | A1* | 6/2016 | Rong | H04L 67/306 709/213 |

FOREIGN PATENT DOCUMENTS

| | | | |
|---|---|---|---|
| WO | WO 2007/048432 | A1 | 5/2007 |
| WO | WO-2014/028672 | A1 | 2/2014 |

OTHER PUBLICATIONS

"WebWorks ePublisher Platform Help," WebWorks, 1 page, [Online] [Retrieved on Mar. 9, 2015], Retrieved from the Internet<URL:http://www.webworks.com/Documentation/Reverb/index.html#page/01.Welcome%20to%20ePublisher/Introduction.4.14.htm>.

"Automatically Update a Web Page with Dynamic Elements," IBM, Oct. 13, 2009, 9 pages, [Online] [Retrieved on Mar. 9, 2015], Retrieved from the Internet<URL:http://www.ibm.com/developerworks/library/wa-aj-dynamic/>.

"Auto Load and Refresh Div Every 10 Seconds with jQuery," Srinivas Tamada's Tech Blog 9 Lessons, Jul. 15, 2009, 17 pages, [Online] [Retrieved on Mar. 9, 2015], Retrieved from the Internet<URL:http://www.9lessons.info/2009/07/auto-load-refresh-every-10-seconds-with.html>.

"Automatic for Mac | MacUpdate," MacUpdate, Dec. 17, 2014, 5 pages, [Online] [Retrieved on Mar. 9, 2015], Retrieved from the Internet<URL:https://www.macupdate.com/app/mac/30171/automatic>.

Extended Search Report from counterpart European Application No. 15761339.9, dated Oct. 2, 2017, 8 pp.

Response to extended European Search Report dated Oct. 2, 2017 from counterpart EP application No. 15761339.9, filed Apr. 5, 2018, 11 pp.

\* cited by examiner

ANALYTICS-BASED UPDATE OF DIGITAL CONTENT

TECHNICAL FIELD

The disclosure relates generally to the field of electronic media, and specifically to updating digital content held by a client device.

BACKGROUND

Users use client devices such as mobile phones and tablet computers to consume many types of digital content. For example, the content can include news, electronic book, video, and audio content. The client devices often store the content locally on the devices, so that the content is readily available to the users.

Some types of content, such as news content, change frequently. Therefore, the client devices frequently update the content stored on the client devices in order to provide the users with fresh content when the users use the client devices. The client devices update the content by fetching the content from one or more content servers. For example, the client devices may be configured to fetch updated content from a content server on a set schedule, such as every four hours.

However, it is difficult for a content server to support content updating on a mass scale. There may be millions of client devices requesting updated content from a content server. Supporting this many client devices requires a large amount of server and network resources. Moreover, it is difficult to scale up the available resources as the number of clients, and attendant update requests, increase. Updating in this manner can also be wasteful because not every client device needs an update on the set schedule. A client device might not need a content update if the user is unlikely to consume the content in the near term. For example, it might not be necessary to update the content in the middle of the night if the user is asleep.

SUMMARY

A computer-implemented method is disclosed for updating content on a client device. Embodiments of the method comprise receiving analytics data describing how a user uses the client device to consume digital content. The embodiments of the method also comprise generating a prediction model based on the analytics data and predicting, using the prediction model, when the user will consume digital content on the client device. Updated digital content is provided to the client device based on the prediction of when the user will consume digital content on the client device.

Another aspect of the disclosure is a non-transitory computer-readable storage medium storing executable computer program instructions for updating content on a client device. The computer program instructions comprise instructions for receiving analytics data describing how a user uses the client device to consume digital content. The computer program instructions also comprises instructions for generating a prediction model based on the analytics data, predicting, using the prediction model, when the user will consume digital content on the client device and providing updated digital content to the client device based on the prediction of when the user will consume digital content on the client device.

Still another aspect of the disclosure provides a client device for consuming digital content. One embodiment of the client device comprises a computer processor for executing computer program instructions and a non-transitory computer-readable storage medium storing computer program instructions. The computer program instructions are executable to perform steps comprising determining analytics data describing how a user uses the client device to consume digital content and generating, based on the analytics data, prediction data describing when the user is predicted to consume digital content on the client device. The computer program instructions are executable to also perform a step of requesting, from a server, updated digital content at a time prior to when the user is predicted to consume digital content on the client device determined in response to the prediction data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

System Overview

In this disclosure, "digital content" generally refers to any machine-readable and machine-storable work product, such as digital news content (e.g., digital newspapers, digital news stories, electronic magazines, etc.), electronic books (e-books), videos, and music files. The following discussion focuses on digital news content. However, the techniques described below can also be used with other types of digital content. For purpose of clarity and conciseness, "digital"

may be occasionally omitted when describing the "digital content" or "digital news content" in the following discussion. For example, "digital content" may be referred to as "content" and "digital news content" may be referred to as "news content" or even "news" by further omitting the "content," hereinafter.

Figure 1:
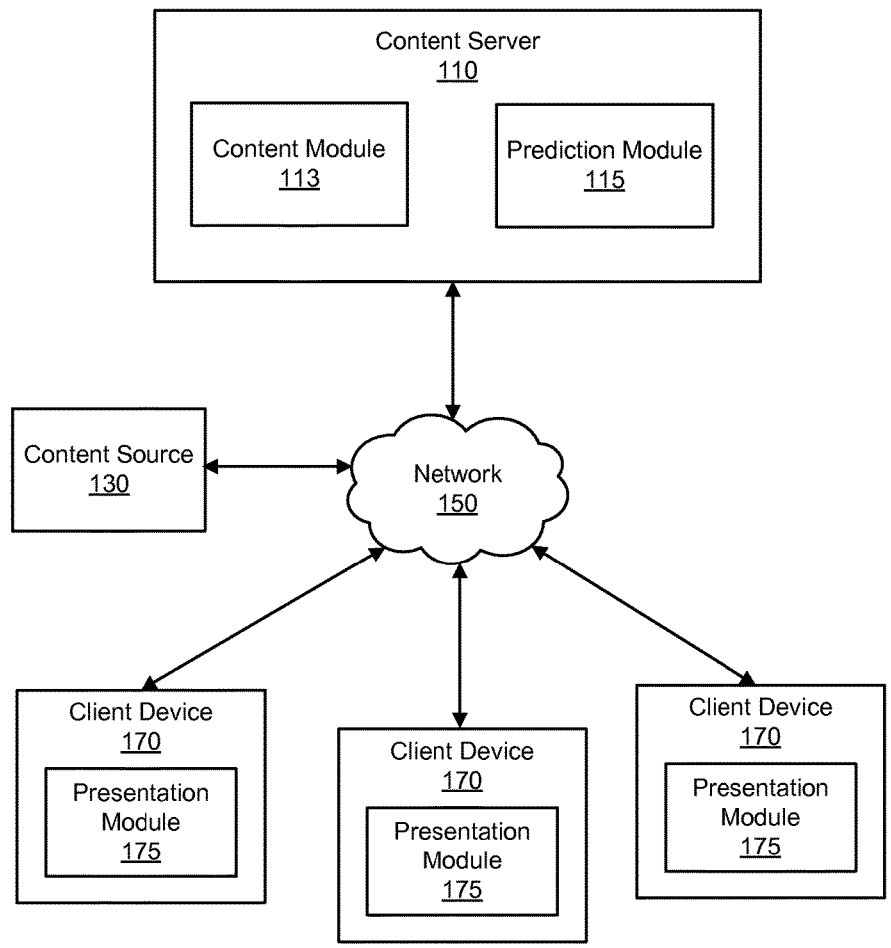
FIG. 1 is a high-level block diagram of a computing environment for supporting analytics-based updating of digital content according to one embodiment.

FIG. 1 shows a computing environment 100 for supporting analytics-based updating of content according to one embodiment. The computing environment 100 includes a content server 110, a content source 130 and a plurality of client devices 170 connected by a network 150. Only one content server 110, one content source 130 and three client devices 170 are shown in FIG. 1 in order to simplify and clarify the description. Embodiments of the computing environment 100 can have many content servers 110, content sources 130 and client devices 170 connected to the network 150. Likewise, the functions performed by the various entities of FIG. 1 may differ in different embodiments.

The content source 130 functions as the originator of the digital content. For example, the content source 130 includes one or more servers connected to the network 150 for providing a variety of different types of content. In one embodiment, the content source 130 provides the content to the content server 110, and the content server provides the content to the client devices 170. In other embodiments, the content source 130 provides the content directly to the client devices 170.

A client device 170 is an electronic device used by one or more users to perform functions such as consuming digital content, executing software applications, browsing websites hosted by web servers on the network 150, downloading files, and interacting with the content server 110. For example, the client device 170 may be a dedicated e-Reader, a smart phone, or a tablet, notebook, or desktop computer. The client device 170 includes and/or interfaces with a display device that presents the content to the user. In addition, the client device 170 provides a user interface (UI), such as physical and/or on-screen buttons, with which the user may interact with the client device 170 to perform functions such as consuming, selecting, and purchasing content.

In one embodiment, the client device 170 includes a presentation module 175. Other embodiments of the client device 170 include different and/or additional modules. In addition, the functions may be distributed among the modules in a different manner than described herein.

The presentation module 175 obtains and presents digital content to the user of the client device 170. In one embodiment, the presentation module 175 collects analytics data describing the states of the client device 170 and how the user uses the client device 170 to consume content. The presentation module 175 provides the analytics data to the content server 110. In addition, the presentation module 175 receives prediction data from the content server 110 that indicates when the user is predicted to consume content on the client device 170. The presentation module 175 uses the prediction data to determine when to request content from the content server 110. For example, the presentation module 175 may request updated news content from the content server 110 shortly before the user is predicted to consume news content on the client device 170. In other embodiments, the presentation module 175 automatically receives pushed updated content from the content server 110 based on predictions made by the content server. In either way, the user can consume the latest content via the client device 170, and the likelihood of the client device 170 making unnecessary content updates is reduced. An exemplary presentation module 175 is described in more detail below with reference to FIG. 4.

The content server 110 provides prediction data and digital content to the client devices 170 via the network 150. In one embodiment, the content server 110 stores digital content collected from the content source 130. In another embodiment, the content server 110 serves as an interface between the client devices 170 and the content source 130 but does not store the content.

The content server 110 includes a content module 113 and a prediction module 115. Other embodiments of the content server 110 include different and/or additional modules. In addition, the functions may be distributed among the modules in a different manner than described herein.

The content module 113 handles content requests from the client devices 170. In general, the content module 113 receives a request for content from a client device 170 and responds to the request by providing the requested content. For example, the content module 113 may receive a request for updated news content from a client device 170 and respond to the request by providing the news content. The content module 113 may also push content to the client devices 170.

The prediction module 115 makes predictions describing how and when users are likely to use the client devices 170 to consume content and provides prediction data describing the predictions to the client devices 170. In one embodiment, the prediction module 115 receives analytics data collected by the client devices 170. The prediction module 115 processes the analytics data to predict future user usage of the client devices 170 to consume digital content. The prediction module 115 then sends prediction data describing the predictions to the client devices 170 and/or uses the prediction data to schedule content pushed to the client devices 170.

The client devices 170 can schedule and make requests for updated content for the users based on the prediction information. The prediction module 115 beneficially provides users with updated content when the users use their client devices 170. In addition, by enabling the client devices 170 to update content when the content is likely to be consumed, the predictions reduce the consumption of server and client device resources associated with unnecessary content updates. An exemplary prediction module 115 is described in more detail below with reference to FIG. 3.

The network 150 enables communications among the content source 130, the content server 110, and client devices 170 and can comprise the Internet. In one embodiment, the network 150 uses standard communications technologies and/or protocols. In another embodiment, the entities can use custom and/or dedicated data communications technologies.

In situations in which the systems discussed here collect personal information about users, or may make use of personal information, the users may be provided with an opportunity to control whether programs or features collect user information (e.g., information about digital news content a user has read, a user's social network, social actions or activities, profession, a user's preferences, or a user's current location), or to control whether and/or how to receive content from the content server 110 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the store server 110.

Computing System Architecture

Figure 2:
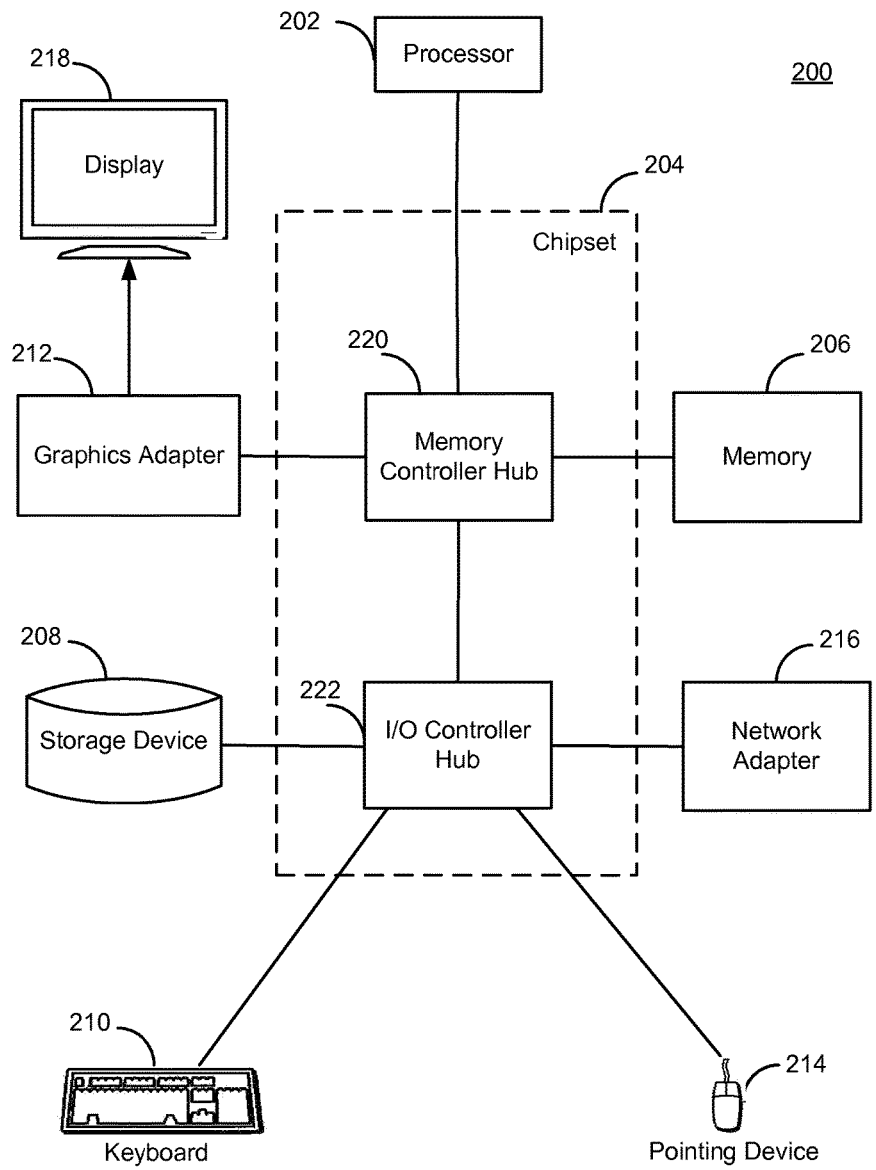
FIG. 2 is a high-level block diagram illustrating an example of a computer for acting as a client device and/or content server in one embodiment.

The entities shown in FIG. 1 are implemented using one or more computers. FIG. 2 is a high-level block diagram of a computer 200 for acting as the content server 110, the content source 130 and/or a client device 170. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 150.

As is known in the art, a computer 200 can have different and/or other components than those shown in FIG. 2. In addition, the computer 200 can lack certain illustrated components. For example, the computers acting as the content server 110 can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Analytics-Based Update of Digital Content

Figure 3:
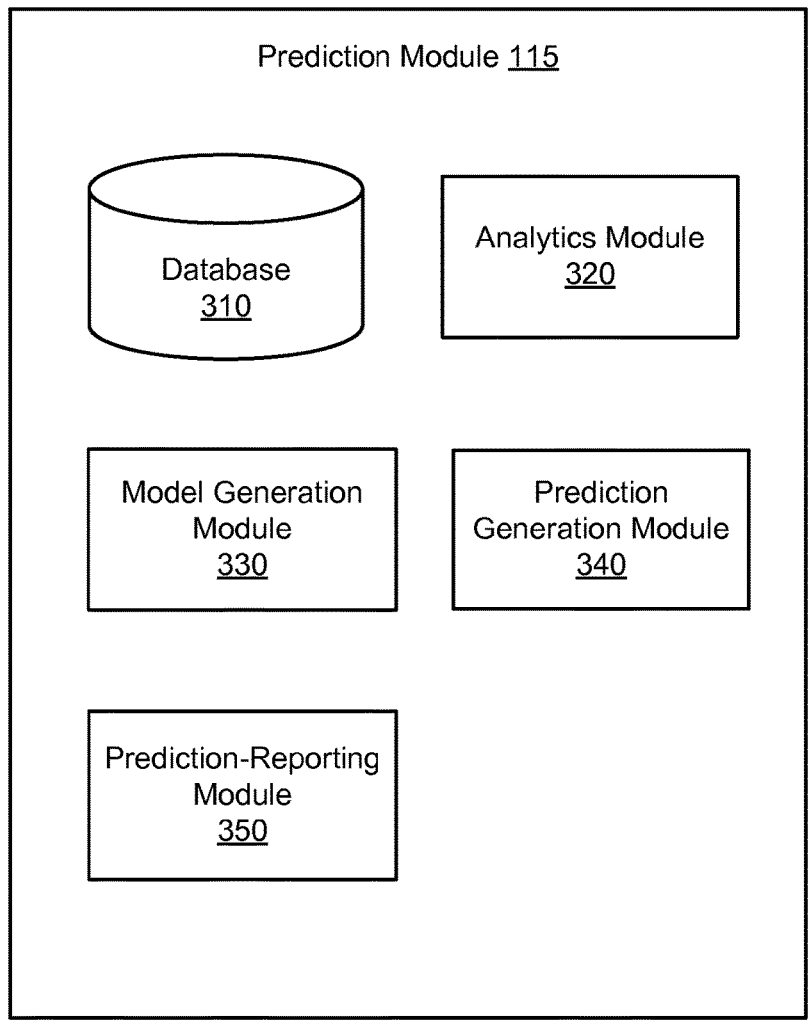
FIG. 3 is a high-level block diagram illustrating a prediction module of a content server according to one embodiment.

FIG. 3 is a high-level block diagram illustrating the prediction module 115 of the content server 110 according to one embodiment. In the embodiment shown, the prediction module 115 has a database 310, an analytics module 320, a model generation module 330, a prediction generation module 340, and a prediction-reporting module 350. Those of skill in the art will recognize that other embodiments of the prediction module 115 can have different and/or additional modules other than the ones described here, and that the functions may be distributed among the modules in a different manner.

The database 310 stores analytics data received from the client devices 170 and prediction data generated based on the analytics data. In some embodiments, the database 310 also stores other data used by the modules within the prediction module 115 to implement the functionalities described herein.

The analytics module 320 receives analytics data from the client devices 170 and stores the analytics data in the database 310. The analytics data describes how users use the client devices 170 (e.g., the applications in the client devices 170) to consume digital content. In one embodiment, the analytics data is represented as a series of "events," with each event describing a change in state of a client device 170.

Events may include state changes describing user interactions with the client device 170. For example, the events may describe actions related to a user's consumption of content, e.g., the user opening a news application on the client device 170, flipping a page of content, scrolling up or down on the content page, zooming content in or out, closing the news application, sharing content with other users; saving or copying content, adding content to a favorites list, etc. In one embodiment, the analytics data may also include information associated with the events. For example, the analytics data may include date and time information, location information, content information, user and client device identifiers, etc., related to the events. Specifically, the analytics data may describe when, where or what content the user uses the client device 170 to read.

Events may also include state changes of the client device 170 not directly related to the user's content consumption. For example, the events may describe the battery level of the client device 170, whether the client device 170 has network connectivity, descriptions of the configuration of the client device 170, etc. Other embodiments may include additional and/or different events than the ones described herein.

Collectively, the events and associated context information in the analytics data describe how the users use the client devices 170. For example, the analytics data may describe usage sessions during which a user uses the client device 170 to consume content. The analytics data describe when these usage sessions tend to occur and the quantity and types of content the user tends to consume during the individual usage sessions. The analytics data also describes periods during which the client device 170 tends to have, or not have, network connectivity.

In one embodiment, the analytics module 320 receives analytics data from the client devices 170 periodically. For example, the analytics module 320 may receive reports from the client devices 170 containing the latest analytics data at certain time intervals such as every day, every week, or every month. In another embodiment, the analytics module 320 receives analytics data about users' consumption from the client devices 170 upon occurrence of the events, upon occurrence of a threshold number of events, and/or at other times.

The model generation module 330 generates prediction models for predicting how and when users will use the client devices 170 in the future based on the analytics data describing past usages. In one embodiment, the model generation module 330 applies machine-learning techniques to the analytics data and generates prediction models for users and their respective client devices 170. That is, the model generation module 330 generates a separate model for each user of each client device 170.

The model generation module 330 creates the model by defining a feature space specifying the features for which prediction can be made. In one embodiment, the model generation module 330 defines a feature space that includes the days of the week (e.g., Monday-Sunday) and segments each day into 48 30-minute time intervals. Thus, the feature space contains 48*7=336 time intervals in which a user may consume, or not consume content using the user's client device 170. Other embodiments use different feature spaces, such as feature spaces representing the days of the month or year, or feature spaces that divide the day into different lengths of time intervals. In addition, the feature spaces could include factors like the number of content sources to which the user subscribes, and whether the client device 170 has network connectivity during the time intervals.

The model generation module 330 analyzes the analytics data for a user and the client device 170 in view of this feature space to predict when the user will use the client device 170 to consume content in the future. In one embodiment, the model generation module 330 trains a machine-learning classifier to make the predictions. A classifier is a statistical model that analyzes data and uses machine-learning techniques to recognize patterns found therein. Specifically, the model generation module 330 uses a support vector machine (SVM) classifier with a Gaussian Kernel as the classifier.

The model generation module 330 trains the model using a user's historical analytics data. Given the feature space, the model generation module 330 treats time intervals in which the user did not use the client device 170 to consume content as negative training examples, and time intervals in which the user did use the client device 170 to consume content as positive training examples. The model generation module 330 trains on these examples to build a model that indicates whether the user is likely to use the client device 170 in given future time intervals. Specifically, the model outputs a binary value for each time interval indicating whether the user is predicted to use the client device 170 to consume content in that time interval. In a simple example, if the analytics data indicates that the user always uses the client device 170 to consume content in the time interval between 8:00-8:30 AM on Mondays, the model will likely predict that the user will consume content for the same time interval on future Mondays.

Further, the model generation module 330 refines the model over time as new analytics data are received from the user's client device 170. The model generation module 330 may also weigh more recent analytics data more heavily than older analytics data, so that the model more accurately reflects the user's current usage of the client device 170. The model generation module 330 may also use the model to make additional predictions, such as predictions of in which time intervals the user's client device 170 is likely to have network connectivity.

The prediction generation module 340 uses the models generated by the model generation module 330 to make predictions for users and client devices 170. The prediction generation module 340 applies current analytics data for the user (e.g., analytics data more recent than the historical data used to train the classifier) to the classifier trained on the historical analytics data to make a current prediction for the user. As described above, the predictions indicate upcoming time intervals in which the user is predicted to use the client device 170 to consume content. In one embodiment, the predictions are binary values indicating in which of the defined time intervals the user is predicted to use the client device 170. For example, the predictions may indicate that the user will consume content using the client device 170 between 8:00-8:30 AM on Monday-Friday, and between 10:00-10:30 AM on Saturdays and Sundays. The prediction generation module 340 saves the predictions in the database 310 as prediction data.

In one embodiment, the prediction generation module 340 makes predictions on a predetermined time-based schedule. For example, the prediction generation module 340 may execute on a fixed schedule, such as every 24 hours, to make predictions for all, or a subset of, the users and client devices 170. The prediction generation module 340 may also make predictions using a schedule determined in response to the results of the predictions. For example, the prediction generation module 340 may make predictions after every N predicted usage intervals, where N is an integer. Thus, the prediction generation module 340 may predict intervals in the upcoming seven days when the user is likely to use the client device 170, and schedule the next execution of the model after the $4^{th}$ such predicted usage interval. This latter technique balances the desire to make accurate, updated predictions with the computational resources required to produce the predictions. The prediction generation module 340 may further make predictions for a specified time in the future. For example, the prediction generation module 340 may make predictions for only the time intervals within the next 24 hours (i.e., for the next day).

In one embodiment, the prediction generation module 340 makes predictions at a schedule determined based on the activeness of the user. For example, the prediction generation module 340 makes predictions for users based on when they were last active. If a user is inactive for a predetermined period (e.g., a week), the prediction generation module 340 may not make predictions for the user until the user becomes active again.

The prediction-reporting module 350 provides predictions made by the prediction generation module 340 to the client devices 170. In one embodiment, the prediction-reporting module 350 provides the prediction data to the client devices 170 in response to requests for updated content from the client devices 170. Thus, when a client device 170 requests content from the content server 110, the prediction-reporting module 350 provides the prediction data to the client device 170 in addition to the requested content.

The prediction-reporting module 350 may provide the prediction data to a client device 170 using one or more of a variety of techniques. In one embodiment, the prediction-reporting module 350 provides the prediction data in the form of an instruction telling the client device 170 when to make a future request for content. To this end, the prediction-reporting module 350 analyzes the prediction data for the user and the client device 170 to determine when the user is predicted to use the client device 170 to consume content. The prediction-reporting module 350 then schedules content requests to occur at times prior to when the user is predicted to consume the content. The prediction-reporting module 350 provides the scheduled content requests to the client device 170 as the instruction, so that the client device 170 refreshes the content before the user consumes it. The amount of time prior to the predicted content consumption can vary in different embodiments and can also be configurable by a user or administrator. For example, the update time may be between 5-30 minutes before the user is predicted to consume the content. Thus, if the user is predicted to consume content at 3:30 PM, the prediction-reporting module 350 might schedule a content request at 3:25 PM so that the client device 170 has refreshed content before the user starts to consume it.

The prediction-reporting module 350 might also take other factors into consideration when scheduling the content request. For example, the prediction-reporting module 350 may use the client device's network connectivity as a factor when scheduling content requests by scheduling the requests for when the client device 170 is predicted to have connectivity. Accordingly, the prediction-reporting module 350 would schedule the content request for a period prior to the predicted content consumption when the client device 170 is predicted to have network connectivity.

If using the technique described above, the prediction data provided by the prediction-reporting module 350 may specify one or more content request times for a client device 170. Thus, the prediction data can specify the single next scheduled content request for the client device 170, or can specify multiple future scheduled content requests. The prediction-reporting module 350 then provides the client device 170 with new prediction data (i.e., subsequent scheduled content requests) when the client device 170 makes the previously scheduled content request.

In another embodiment, the prediction-reporting module 350 provides the actual predictions to the client devices 170 as the prediction data. Thus, the prediction-reporting module 350 provides a list of the future time intervals in which the user is predicted to use the client device 170 to consume content. For example, the prediction data can be sent as a vector of binary values, which each portion in the vector representing a particular time interval and the value at the position indicating the prediction. The client device 170 then uses the time intervals in the prediction data to determine when to schedule content update requests.

In one embodiment, the prediction-reporting module 350 pushes content to the client devices 170 based on predictions made by the prediction generation module 340. For example, the prediction-reporting module 350 receives from the prediction generation module 340 prediction data indicating when a user will consume content on the client device 170. The prediction-reporting module 350 then sends updated content to the client device 170 shortly before the user is predicted to consume the content on the client device 170. In other words, the prediction-reporting module 350 provides content to the client device 170 without receiving any request for content from the client device 170.

Figure 4:
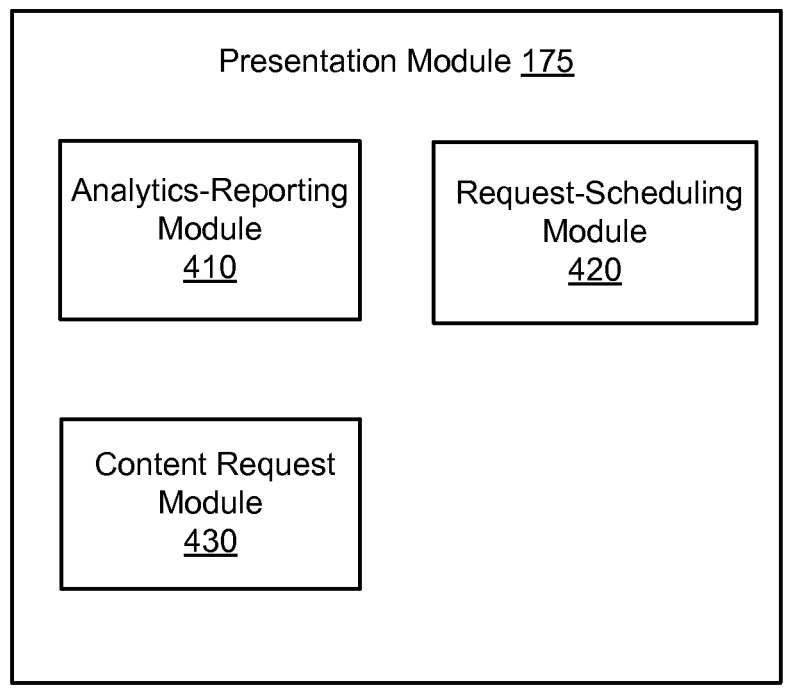
FIG. 4 is a high-level block diagram illustrating a presentation module on a client device according to one embodiment.

FIG. 4 is a high-level block diagram illustrating a presentation module 175 on a client device 170 according to one embodiment. The presentation module 175 shown includes an analytics-reporting module 410, a request-scheduling module 420 and a content request module 430. Other embodiments of presentation module 175 include different and/or additional modules. In addition, the functions may be distributed among the modules in a different manner than described herein.

The analytics-reporting module 410 captures analytics data and provides the analytics data to the content server 110. As mentioned above, the analytics data describes how a user uses the client device 170. In one embodiment, the analytics-reporting module 410 observes how users use the client device 170 to consume the digital content and generates the analytics data based on the observations. For example, the analytics-reporting module 410 may be integrated into a content consumption application executed on the client device 170 in order to capture events about users' reading content via the application and generate the analytics data therefrom.

The request-scheduling module 420 determines when to request a content update from the content server 110 based on the received prediction data. In one embodiment, the prediction data specifies when the client device 170 should request the content update. In this case, the request-scheduling module 420 schedules the content update for the specified time.

In another embodiment, the prediction data specifies a list of future time intervals in which the user is predicted to use the client device 170 to consume content. In this latter embodiment, the request-scheduling module 420 analyzes the prediction data to determine when to schedule content update requests. For example, the request-scheduling module 420 may schedule a content update request just before the user is predicted to use the client device 170 to consume content, and/or at a time when the client device 170 is predicted to have network connectivity prior to when the user is expected to consume content, similar to how the prediction-reporting module 350 schedules content requests.

The content request module 430 requests and receives content from the content server 110. In one embodiment, the content request module 430 sends requests for updated content to the content server 110 based on the schedule specified by the request-scheduling module 420. For example, the content request module 430 may be activated by the request-scheduling module 420 at the scheduled times. The content request module 430 stores the received content at the client device 170, so that the content may be consumed by the user.

In one embodiment, the request-scheduling module 420 and the content request module 430 are optional components of the client device 170. For example, the client device 170 can automatically receive updated content from the content server 110 without scheduling requests or sending the requests to the content server 110. Correspondingly, as described above with reference to FIG. 3, the prediction-reporting module 350 can push content to the client device 170 based on predictions, without requiring the client device 170 to request the content. Therefore, in such an embodiment, the client device 170 may not include the request-scheduling module 420 and the content request module 430.

Further, some embodiments of the client device 170 perform one or more functionalities of the content server 110 described above with reference to FIG. 3. Rather than sending analytics data to the content server 110, the client device may 170 store the analytics data locally. The client device 170 may contain a model generation module 330 like that described in the content server 110 and use this module to analyze the local analytics data and generate prediction models for predicting how and when the user will use the client devices 170 to consume content in the future. The client device 170 may also include a prediction generation module 340 that uses the models to predict when the user will consume content. The client device 170 may then request content from the content server 110 based on the predictions.

Exemplary Methods

Figure 5:
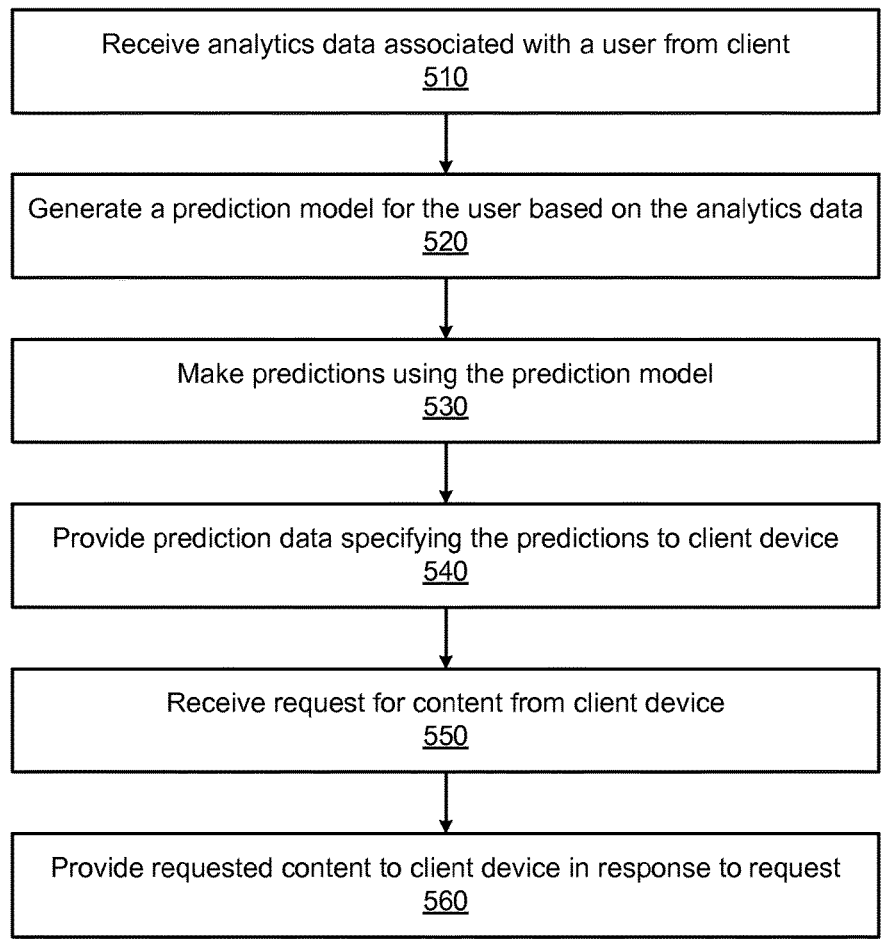
FIG. 5 is a flowchart illustrating a process for updating content for users based on analytics data implemented by the content server according to one embodiment.

FIG. 5 is a flowchart illustrating a process for updating content for users based on analytics data according to one embodiment. FIG. 5 attributes the steps of the process to the content server 110. However, some or all of the steps may be performed by other entities. In addition, some embodiments may perform the steps in parallel, perform the steps in different orders, or perform different steps.

Initially, the prediction module 115 in the content server 110 receives 510 analytics data associated with a user from a client device 170. As described previously with regard to FIG. 3, the prediction module 115 may receive analytics data about a user's content consumption from the client device 170 periodically, upon the occurrence of an event, upon occurrence of a threshold number of events, or at other times.

The prediction module 115 in the content server 110 generates 520 a prediction model for the user based on the analytics data. The prediction model defines a feature space specifying intervals at which the user might use the client device 170 to consume content. The prediction module 115 trains the model using the analytics data. The prediction module 115 makes 530 predictions using the trained prediction model. The predictions describe when the user is likely to use the client device 170 to consume content. The predictions may also indicate when the client device 170 is likely to have network connectivity.

The prediction module 115 provides 540 prediction data specifying the predictions to the client device 170. The prediction data may include an instruction instructing the client device 170 to request updated content at a specified time. Alternatively, the prediction data may provide predicted usage times to the client device 170, so that the client device 170 can use the predicted usage times to determine when to request updated content.

The content module 113 in the content server 110 receives 550 requests for content from the client device 170 and provides 560 the requested content to the client device 170 in response to the requests. For example, the content module 113 maintains updated content received from the content source 130 and sends the content from the content source 130 to the client device 170 upon receiving requests from the client device 170.

Figure 6:
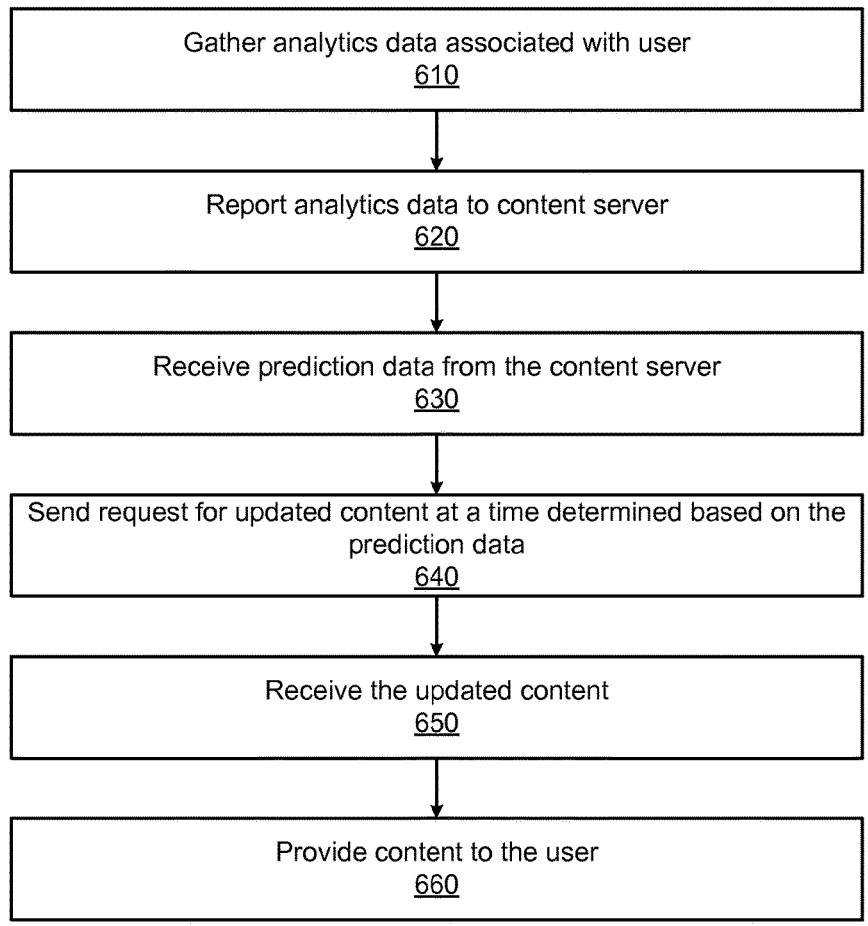
FIG. 6 is a flowchart illustrating a process for providing updated content to users implemented by the client devices according to one embodiment.

FIG. 6 is a flowchart illustrating a process for providing updated content to users implemented by the client devices 170 according to one embodiment. FIG. 6 attributes the steps of the process to the presentation module 175 of a client device 170. However, some or all of the steps may be performed by other entities. In addition, some embodiments may perform the steps in parallel, perform the steps in different orders, or perform different steps.

Initially, the presentation module 175 gathers 610 analytics data associated with a user of the client device 170. The presentation module 175 observes how the user uses the application on the client device 170 to consume (e.g., read) digital content and generates analytics data based on the observations. The presentation module 175 also reports 620 the analytics data to the content server 110. The presentation module 175 may send the analytics data to the content server 110 periodically, upon occurrence of events, upon occurrence of a threshold number of events, or at other times.

The presentation module 175 receives 630 prediction data from the content server 110. The prediction data includes an instruction to request updated content at a specified time, and/or indicates times when the user is predicted to use the client device 170 to consume content. In this latter case, the presentation module 175 may analyze the prediction data to determine when to request updated content.

At step 640, the presentation module 175 sends 640 a request for updated content at a time determined based on the prediction data. The presentation module 175 receives 650 the updated content in response to the request and provides 660 the content to the user.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method of configuring a plurality of client devices to request updated digital content at future times, prior to when respective users of the plurality of client devices are predicted to consume the updated digital content, the method comprising:
   receiving analytics data describing how a particular client device from the plurality of client devices has been used in the past to consume the digital content;
   generating, based on the analytics data and for a user of the particular client device, a prediction model defining a feature space describing features representative of future time intervals for requesting the updated digital content;
   generating, using the prediction model, prediction data indicating initial time intervals during which the client device is predicted to have network connectivity by which to issue a request for updated digital content and by which to establish a network session with a server sourcing the updated digital content, prior to subsequent time intervals during which the client device is predicted to be used to consume the digital content;
   configuring the particular client device to request the updated digital content in the initial time intervals and prior to the subsequent time intervals by providing the prediction data to the particular client device;
   receiving, from the particular client device, in the initial time intervals and prior to the subsequent time intervals, the request for the updated digital content; and
   in response to receiving the request, configuring the particular client device to use the updated digital content when responding to user requests for the updated digital content made during the subsequent time intervals by at least providing, in the initial time intervals and prior to the subsequent time intervals, the updated digital content to the particular client device.

2. The method of claim 1,
   wherein generating the prediction model based on the analytics data further comprises training, based on the analytics data, a classifier to make predictions for the features in the feature space, and
   wherein determining the prediction data comprises using the classifier to predict the future time intervals for requesting the updated digital content.

3. The method of claim 1,
   wherein providing the prediction data to the client device comprises providing, to the client device, information indicating a list of future time intervals in which the client device will be used to consume digital content, each future time interval in the list of future time intervals occurring in the initial time intervals and prior to the subsequent time intervals, and
   wherein receiving the request comprises receiving the request according to the list of future time intervals.

4. A non-transitory computer-readable storage medium storing executable computer program instructions for configuring a plurality of client devices to request updated digital content at future times, prior to when respective users of the plurality of client devices are predicted to consume the updated digital content, the computer program instructions comprising instructions for:
   receiving analytics data describing how a particular client device from the plurality of client devices has been used in the past to consume the digital content;
   generating, based on the analytics data and for a user of the particular client device, a prediction model defining a feature space describing features representative of future time intervals for requesting the updated digital content;

generating, using the prediction model, prediction data indicating initial time intervals during which the client device is predicted to have network connectivity by which to issue a request for updated digital content and by which to establish a network session with a server sourcing the updated digital content, prior to subsequent time intervals during which the client device is predicted to be used to consume the digital content;

configuring the particular client device to request the updated digital content in the initial time intervals and prior to the subsequent time intervals by providing the prediction data to the particular client device;

receiving, from the particular client device, in the initial time intervals and prior to the subsequent time intervals, the request for the updated digital content; and in response to receiving the request, configuring the particular client device to use the updated digital content when responding to user requests for the updated digital content made during the subsequent time intervals by at least providing in the initial time intervals and prior to the subsequent time intervals, the updated digital content to the particular client device.

5. The computer-readable storage medium of claim 4, wherein the computer program instructions for generating the prediction model based on the analytics data further comprise instructions for:

training, based on the analytics data, a classifier to make predictions for the features in the feature space, and wherein determining the prediction data comprises using the classifier to predict the future time intervals for requesting the updated digital content.

6. The computer-readable storage medium of claim 4, wherein the computer program instructions for providing the prediction data to the client device comprise instructions for:

providing, to the client device, information indicating a list of future time intervals in which the client device will be used to consume digital content, each future time interval in the list of future time intervals occurring in the initial time intervals and prior to the subsequent time intervals, receiving the request comprises receiving the request according to the list of future time intervals.

7. The computer-readable storage medium of claim 4, wherein the prediction data includes a predetermined time-based schedule specifying the initial time intervals during which the client device is predicted to have network connectivity by which to issue a request for updated digital content prior to the subsequent time intervals during which the client device is predicted to be used to consume the digital content.

8. The computer-readable storage medium of claim 7, wherein the time-based schedule is determined based on activeness of the user.

9. A computing system for configuring a plurality of client devices to request updated digital content at future times, prior to when respective users of the plurality of client devices are predicted to consume the updated digital content, the computing system comprising:

a computer processor for executing computer program instructions; and a non-transitory computer-readable storage medium storing computer program instructions executable to perform steps comprising:

receiving analytics data describing how a particular client device from the plurality of client devices has been used in the past to consume the digital content;

generating, based on the analytics data and for a user of the particular client device, a prediction model defining a feature space describing features representative of future time intervals for requesting the updated digital content;

generating, using the prediction model, prediction data indicating initial time intervals during which the client device is predicted to have network connectivity by which to issue a request for updated digital content and by which to establish a network session with a server sourcing the updated digital content, prior to subsequent time intervals during which the client device is predicted to be used to consume the digital content;

configuring the particular client device to request the updated digital content in the initial time intervals and prior to the subsequent time intervals by providing the prediction data to the particular client device;

receiving, from the particular client device, in the initial time intervals and prior to the subsequent time intervals, the request for the updated digital content; and in response to receiving the request, configuring the particular client device to use the updated digital content when responding to user requests for the updated digital content made during the subsequent time intervals by at least providing, in the initial time intervals and prior to the subsequent time intervals, the updated digital content to the particular client device.

10. The computing system of claim 9, wherein generating the prediction model further comprises training a classifier to make predictions for the features in the feature space using the analytics data, and wherein determining the prediction data comprises using the trained classifier to predict the future time intervals for requesting the updated digital content.

11. The computing system of claim 9, wherein the prediction data includes a predetermined time-based schedule specifying the initial time intervals during which the client device is predicted to have network connectivity by which to issue a request for updated digital content prior to the subsequent time intervals during which the client device is predicted to be used to consume the digital content.

12. The computing system of claim 11, wherein the time-based schedule is determined based on activeness of the user.

* * * * *